United States Patent [19]

Whitehead

[11] Patent Number: 4,937,716
[45] Date of Patent: Jun. 26, 1990

[54] ILLUMINATING DEVICE HAVING NON-ABSORPTIVE VARIABLE TRANSMISSIVITY COVER

[75] Inventor: Lorne A. Whitehead, Vancouver, Canada

[73] Assignee: Tir Systems Ltd, Canada

[21] Appl. No.: 190,662

[22] Filed: May 5, 1988

[51] Int. Cl.⁵ .............................................. F21V 8/00
[52] U.S. Cl. ..................................... 362/268; 362/31; 362/32; 362/327; 362/307; 350/314
[58] Field of Search ............... 362/268, 293, 307, 308, 362/309, 310, 328, 331, 31, 327, 332, 339, 342, 317, 300, 321; 350/276 R, 314

[56] References Cited

U.S. PATENT DOCUMENTS

| | | | |
|---|---|---|---|
| 3,236,290 | 2/1966 | Lueder | 350/314 |
| 3,267,598 | 8/1966 | Olesen et al. | 362/293 |
| 4,059,916 | 11/1977 | Tachihara et al. | 362/31 |
| 4,096,550 | 6/1978 | Boller et al. | 362/31 |
| 4,161,015 | 7/1979 | Dey et al. | 362/263 |
| 4,524,410 | 6/1985 | Kawakatsu et al. | 362/293 |
| 4,642,736 | 2/1987 | Masuzawa et al. | 362/328 |
| 4,729,068 | 3/1988 | Ohe . | |
| 4,779,166 | 10/1988 | Tanaka et al. | 362/307 |
| 4,794,492 | 2/1988 | Vinther | 362/31 |

FOREIGN PATENT DOCUMENTS 400029 1/1933 United Kingdom ............ 362/22 X

Primary Examiner—Ira S. Lazarus
Assistant Examiner—D. M. Cox
Attorney, Agent, or Firm—Lerner, David, Littenberg

[57] ABSTRACT

An illuminating device with a light source having a longitudinally specular light reflector; and, a light escapement part having a substantially non light absorptive cover. The light transmissivity of the cover an any point on the cover varies as a function of the position of that point, such that the luminance of light escaping through the cover at that point has a selected luminous exitance as a function of the position of that point.

28 Claims, 2 Drawing Sheets

ILLUMINATING DEVICE HAVING NON-ABSORPTIVE VARIABLE TRANSMISSIVITY COVER

FIELD OF THE INVENTION

This application pertains to an illuminating device having a light source with a longitudinally specular reflector, and having a substantially non-light absorptive, variable transmissivity cover. The luminous exitance of light escaping through the cover can be controlled as a function of position on the cover.

BACKGROUND OF THE INVENTION

There are many situations in which it is desirable to have uniform light exitance from an illuminating device. That is, it is often desirable that the luminance of light which escapes from an illuminating device be substantially constant at all light escapement points on the device. Consider for example rear illuminated panel signs of the type commonly used for advertising purposes. Light from one or more light sources located behind a translucent, message-bearing panel escapes through the panel. Ideally, the luminance of the escaping light is substantially identical at all points on the outer surface of the panel so that the viewer perceives a pleasing, uniformly illuminated image, devoid of regions which appear to be darker or brighter than other regions on the panel.

It is also desirable to minimize the number of light sources employed in illuminating devices like those described above, in order to reduce the cost of manufacturing and/or servicing the device, to reduce the size of the device, and to increase the reliability of the device (a single, expensive light source is typically more reliable than a multiplicity of inexpensive sources and can be less expensive as well). However, if a single light source, or a small number of concentrated light sources are used, then the light must be distributed in order to achieve uniform light exitance from the device. Commonly, reflectors are positioned within the device so that light emanating from the light source is, in effect, reflected many times within the device before escaping through a light escapement port such as the translucent advertising sign panel mentioned above. This ensures that the quantity of light escaping at different points on the device is substantially the same, resulting in uniform illumination.

Two classes of prior art device employ the foregoing technique. The first class of device, of which conventional lampshades and back-lit panels are typical, uses reflective material which is diffuse—such that light is reflected from the material in a random direction (i.e. the reflected light has an approximately Lambertian angular intensity distribution; where the intensity is proportional to the cosine of the angle from the normal direction to the surface through which the light escapes). However, this approach is very limited in terms of the distance over which light can be distributed. The problem, as explained below, is that in order to distribute the light an average of "n" diameters, the device must reflect the light an average of n-squared times. Since a fraction of the incident light is inevitably absorbed by the reflector each time it reflects the light, the efficiency of this class of device drops extremely rapidly as the light distribution distance increases.

The second class of device avoids the foregoing problem by employing longitudinally specular reflective materials. Such material reflects light with the important characteristic that each reflected light ray has the same component of motion in a preferred direction relative to the material. Typically, this direction corresponds to a well defined longitudinal axis of the device. Since the component of motion in the direction of the longitudinal axis of the device is now constant for each reflected light ray (rather than randomly changing, as in the first class of device) the distribution distance for a particular light ray increases in proportion to the number of reflections of that ray. Accordingly, light can be distributed over greater distances, with reasonable efficiency. Unfortunately however, longitudinally specular light reflecting materials capable of reflecting light in the foregoing manner over a broad range of angles of incidence are extremely expensive. Although there are some inexpensive longitudinally specular materials capable of reflecting light in the foregoing manner over a narrow range of angles of incidence, these greatly restrict the overall geometry of the resultant illuminating device and also restrict the types of light sources which can be employed.

SUMMARY OF THE INVENTION

In accordance with a first embodiment, the invention provides an illuminating device having a light source; and, a light escapement port having a substantially non light absorptive cover. The transmissivity of the cover at any particular point on its surface is varied as a function of the position of the particular point, whereby light escaping through the cover at the particular point has a selected luminous exitance as a function of the position of the particular point. The cover's transmissivity variation is such that the luminance of light escaping through the cover is more uniform at all points on the cover than would be the case if the transmissivity of the cover did not vary. The light escapement port is advantageously a sealed enclosure having a window; and the light source is located, topologically, outside the enclosure, adjacent the window, so that light produced by the light source will pass through the window for illumination within the enclosure. This prevents contamination of the interior region of the enclosure, thus maintaining the capability of the device to efficiently distribute light, and also simplifies replacement of the light source. The first embodiment of the invention may be adapted to specific illumination requirements by employing two or more light sources, each having a unique spectral characteristic. Devices employing a first metal halide light source and a second high pressure sodium light source are preferred.

SUMMARY OF THE INVENTION

The invention provides an illuminating device having a light source with a partially transmissive, longitudinally specular light reflector; and, a light escapement port having a substantially non light absorptive cover. The transmissivity of the cover separate from the reflector at any particular point on its surface is varied as a function of the position of the particular point. Accordingly, light escaping through the cover at the particular point has a selected luminous exitance as a function of the position of the particular point. The cover's transmissivity variation is preferably, but not necessarily, such that the luminance of light escaping through the cover is more uniform at all points on the cover than would be the case if the transmissivity of the cover did not vary.

The transmissivity of the cover is advantageously varied such that the luminance of light escaping through the cover is substantially equal at all points on the cover.

The reflector may have a number of characteristics. For example, the reflector may be substantially coextensive with the cover, thus simplifying manufacture of the cover and reflector as a single unit. The reflector may also be partially transmissive to light, in order to balance factors of cost and efficiency. The reflector may also be shaped and/or oriented to direct a substantial portion of the light emitted by the light source in a direction which is substantially parallel to the surface of the cover closest to the light source; and, away from the light source—thereby increasing the light distribution distance. The reflector may also be a prismaticly shaped dielectric having at least some reflectivity due to total internal reflection within the reflector, in order to minimize light absorption by the reflector and enhance the efficiency of the device. The reflector may also be made up of one or more dielectric interfaces in order to improve its efficiency.

DETAILED DESCRIPTION OF THE PREFERRED EMBODIMENT

Before discussing the invention in detail, it will be convenient to examine the properties of diffuse and specular light reflecting materials.

Consider a generalized light reflector of thickness "t" consisting of material having the bulk property that, per unit length, the material absorbs a fraction "a" of the light transmitted through it, and reflects a fraction "r" of the light transmitted through it. Let "R" be the fraction of light incident on the reflector which is reflected backward by the reflector; let "T" be the fraction of light incident on the reflector which is transmitted through the reflector; and, let "A" be the fraction of light incident on the reflector which is absorbed by the reflector. These fractions together constitute 100% of the light incident on the reflector (i.e. R+A+T=1). In general R, A, and T are complicated functions of r, a, and t. However, in the case where a/r<1; at <1; and, rt >1, the relationships can be simplified as follows:

$$R = \frac{rt}{1 + rt} - \frac{2at}{3} \quad (1)$$

$$A = at \quad (2)$$

$$T = \frac{1}{1 + rt} - \frac{at}{3} \quad (3)$$

Figure 1:
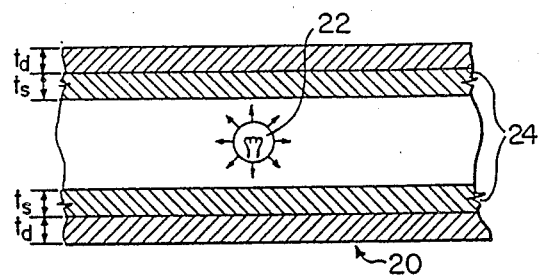
FIG. 1 is a cross-sectional illustration of an illuminating device having a hybrid diffuse, specular light reflector in accordance with the invention.

Although the two classes of prior art devices discussed above employ either diffuse or specular reflectors, the invention described herein may employ a hybrid diffuse, specular reflector and it is therefore worthwhile to consider FIG. 1, which depicts, in cross-section, an illuminating device 20 having a light source 22 and a hybrid reflector 24 which consists of an inside layer of thickness $t_s$ of longitudinally specular material, and an outside layer $t_d$ of diffusely specular material, both having the same values of a and r.

It is useful to begin with a discussion of the properties which characterize diffuse and specular light reflectors, to enable those skilled in the art to appreciate the way in which hybrid (i.e. diffuse/specular) reflectors may be fabricated. Such hybrid reflectors facilitate construction of illuminating devices in which luminous exitance can be varied as a function of position on the device.

It can readily be shown that the mean distribution distance "x" (i.e. the average distance light travels within device 20, before escaping from the device) is proportional to the average number of times a light ray is reflected by the inner layer of specular material before penetrating into the outer layer of diffuse material, multiplied by the square root of the average number of times any particular light ray is reflected by the outer layer of diffuse material before escaping from device 20. Algebraically, this can be expressed as:

$$x = (1 + rt_s)(1 + rt_d)^{\frac{1}{2}} \quad (4)$$

Using the rough approximation that equations 1, 2, and 3 apply reasonably well to combinations of diffuse and longitudinally specular materials, the total absorptivity "A" and transmissivity "T" of hybrid reflector 24 will be:

$$A = a(t_s + t_d) \quad (5)$$

$$T = \frac{1}{1 + r(t_s + t_d)} \quad (6)$$

Since eventually all of the light energy emitted by light source 22 is either absorbed or transmitted, the ratio of these will simply be A/T and therefore, the total efficiency "E" of device 20 will be:

$$E = 1 - ar(t_s + t_d)^2 \quad (7)$$

For the purpose of evaluating the relative merits of different illuminating devices, it is worthwhile to consider the practical cost of longitudinally specular versus diffuse reflective materials. Although many issues are involved in optimising any optical design, it is not unreasonable to model these to correspond to a "cost" of some kind, and to associate such costs with the materials themselves. Therefore, let us assume that longitudinally specular reflective materials cost M times more to use than the corresponding diffuse reflective materials. Thus, the characteristic cost "C" of an illuminating device having a hybrid reflector is:

$$C = Mt_s + t_d \quad (8)$$

As an aid to understanding the foregoing, consider the specific case where a = 0.1, r = 100, and C = 100. (a/r and M here correspond roughly to commonly available reflective materials such as papers and thin plastic sheeting).

For any desired value of the mean distribution distance x, there exists a value of $t_s$ which will yield the desired value of x with $t_d=0$. At the opposite extreme, where $t_s=0$, there is a value of $t_d$ which will also yield the desired value of x. For any intermediate cases with a combined $t_s$ and $t_d$ satisfying equation 4, the efficiency of the device is given by equation 7 and its cost by equation 8.

Figure 3:
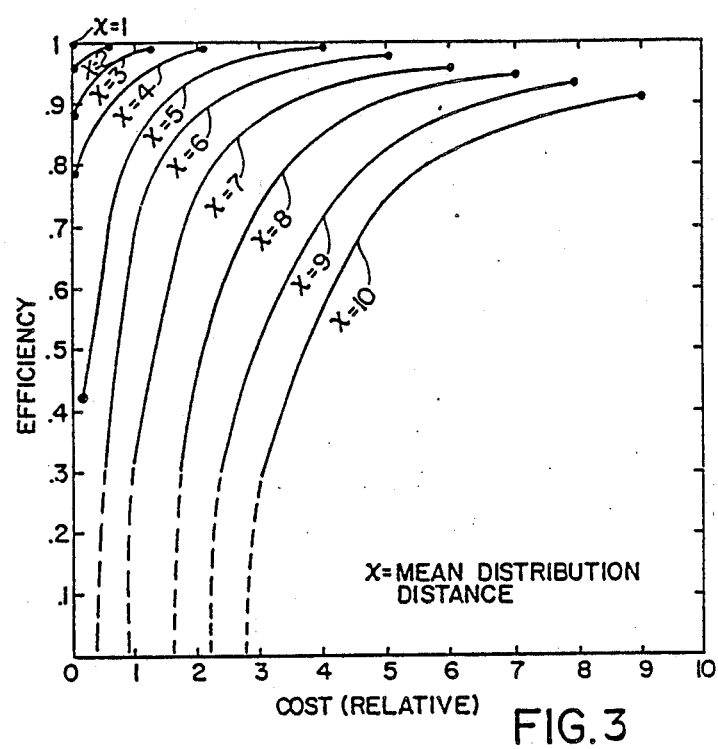
FIG. 3 is a graph on which the illumination efficiency of an illuminating device is plotted as the ordinate, versus the relative cost of the device as the abscissa, for various values of mean light distribution distance.

FIG. 3 plots these values of efficiency and cost for various values of x. As can be seen, small values of x can be efficiently produced with purely diffuse reflective material at very low cost, which is the reason lamp shades are so made. Conversely, values of x in excess of 10 can only be achieved efficiently by using specular reflective materials, which is why prism light guides are so made. However, for intermediate values, such as x=7, it can be seen that substantial efficiency can be obtained at low cost through using a hybrid approach, where most of the reflectivity is obtained from the diffuse material, but the presence of the specular material radically improves the overall efficiency of the device.

Figure 4:
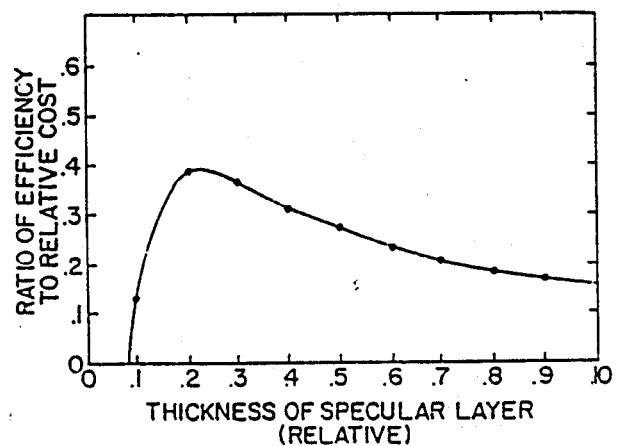
FIG. 4 is a graph on which the ratio of efficiency to relative cost of an illuminating device is plotted as the ordinate, versus the relative thickness of longitudinally specular reflective material employed in the device, for the case in which the mean light distribution distance of the device "X"=7.

Considering the case of x=7 in detail, FIG. 4 shows a plot of the ratio of efficiency to cost for the device, as the reflector varies from being entirely diffuse (i.e. $t_s=0$) to entirely specular (i.e. $t_d=0$). As can be seen, when 20% of the specular material that would be required to cause the diffusion in a purely specular reflector is employed, the best "value", in terms of the ratio of efficiency to cost, is obtained.

With the foregoing in mind, we may now consider present invention, in which the requirement of extremely low absorptivity is reduced somewhat, through the inclusion of some type of longitudinally specular material, as discussed above. The longitudinally specular material may consist of multilayer dielectric interfaces, and/or transparent materials having complex shape but constant cross-sectional shape. An example of the latter material is prism light guide material which is extremely reflective for certain angles of incidence.

Figure 2:
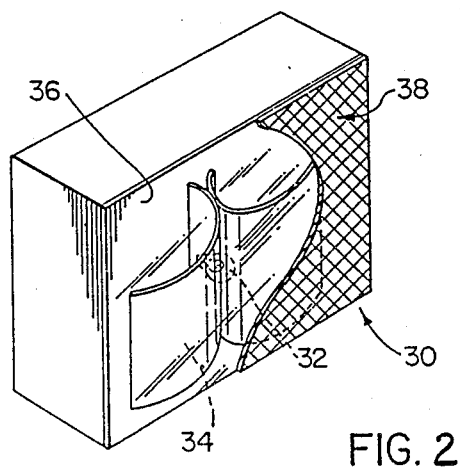
FIG. 2 is more generalized pictorial illustration of an illuminating device constructed in accordance with the invention.

As depicted in FIG. 2, invention may take the form of an illuminating device 30 having a light source 32 with a light reflector 34 which is at least partially longitudinally specular. A "light escapement port"; namely, transparent panel 36, which has a substantially non light absorptive cover 38 (denoted in FIG. 2 by cross hatching on panel 36, and shown partially removed to avoid obscuring details of light source 32 and reflector 34) is provided. All surfaces of device 30 other than panel 36 are preferably covered with reflective material in order to confine light within device 30 for ultimate escape through cover 38. The light transmissivity of cover 38 (i.e. the fraction of incident light which escapes through cover 38) at any particular point on the surface of cover 38 is varied, as hereinafter described, as a function of the position of the particular point, whereby light escaping through cover 38 at the particular point has a selected luminous exitance as a function of the position of the particular point. The cover's transmissivity variation is preferably, but not necessarily, such that the luminance of light escaping through cover 38 is more uniform at all points on the cover than would be the case if the transmissivity of cover 38 did not vary.

Reflector 34 may have a number of characteristics. For example, reflector 34 may be substantially coextensive with cover 38, thus considerably simplifying manufacture of reflector 34 and cover 38 as a single unit. Reflector 34 may also be partially transmissive to light, in order to balance factors of cost and efficiency as discussed above. Reflector 34 may also be shaped and/or oriented to direct a substantial portion of the light emitted by light source 32 in a direction which is substantially parallel to the surface of cover 38 closest to light source 32; and, away from light source 32— thereby increasing the distance over which device 30 may distribute light. Reflector 34 may also be a prismaticly shaped dielectric having at least some reflectivity due to total internal reflection within the reflector, in order to minimize light absorption by the reflector and enhance the efficiency of device 30. Reflector 34 may also be made up of one or more dielectric interfaces in order to improve its efficiency.

TRANSMISSIVITY VARIATION

For a particular illuminating device having a particular shape, it will be necessary to determine experimentally, for different points on the cover of the device, the transmissivity variation required to achieve the selected luminous exitance at each point. However, once that has been done, corresponding devices can readily be mass-produced. The desired transmissivity variation will be such that the luminance of light escaping through the cover is more uniform at all points on the cover than it would be if the transmissivity did not vary. In many practical situations (i.e. advertising signs) it will be desirable to attain a transmissivity variation which is such that the luminance of light escaping through the cover of the illuminating device is substantially equal at all points on the cover.

A variety of techniques may be employed to vary the transmissivity of the cover. For example, the thickness of the cover may be varied at different points on its surface. If the thickness of the cover were constant, and if no other transmissivity variation technique was employed, then a viewer could perceive a region of brightness on the cover, near the light source, and regions of diminishing brightness on the cover at progressively increasing distances away from the light source. However, if the cover is thickest near the light source, and becomes progressively thinner as distance increases away from the light source, then the transmissivity of the cover will vary such that a viewer perceives a different luminance distribution over the cover. In particular, the thickness of the cover may be experimentally varied to determine the particular thickness variation required to obtain uniform luminance at all points on the cover.

Alternatively, a substantially non light absorbing, light reflecting material may be painted, sprayed, or otherwise applied to the cover. TYVEK, titanium doped acrylic plastic, molded polymeric foam, metallic or non-metallic thin films, STYROFOAM, expanded polyethylene, and white paint are examples of suitable non light absorbing, light reflecting materials. These materials are preferably applied to the cover such that the density of the material on the cover varies as a function of position on the cover so as to yield the desired transmissivity variation.

As a further alternative, the transmissivity of the cover may be varied by applying to the cover a series of "n" layers of substantially non light absorbing, light reflecting material, one layer atop the other, where "n" varies as a function of position on the cover.

As will be apparent to those skilled in the art, in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. An illuminating device, comprising:
   (a) a light source having a longitudinally specular light reflector; and,
   (b) a light escapement port having a substantially non light absorptive cover separate from said reflector, the transmissivity of said cover at any point on said cover varying as a function of the position of said point, whereby light escaping through said cover at said point has selected luminous exitance as a function of said position;
   wherein said reflector comprises:
   (i) a partially transmissive light reflector; and,
   (ii) one or more dielectric interfaces.

2. An illuminating device as defined in claim 1, wherein said transmissivity variation is such that the luminance of light escaping through said cover is more uniform at all points on said cover than said luminance would be if said transmissivity did not vary.

3. An illuminating device as defined in claim 1, wherein said transmissivity variation is such that the luminance of light escaping through said cover is substantially equal at all points on said cover.

4. An illuminating device as defined in claim 1, wherein said reflector is substantially coextensive with said cover.

5. An illuminating device as defined in claim 1, wherein said reflector is shaped to direct a substantial portion of the light emitted by said light source in a direction which is:
   (a) substantially parallel to the surface of said cover closest to said light source; and,
   (b) away from said light source.

6. An illuminating device as defined in claim 1, wherein said reflector is oriented relative to said light source to direct a substantial portion of the light emitted by said light source in a direction which is:
   (a) substantially parallel to the surface of said cover closest to said light source; and,
   (b) away from said light source.

7. An illuminating device as defined in claim 1, wherein said device further comprises a hollow enclosure.

8. An illuminating device as defined in claim 7, wherein said light source is contained within said enclosure.

9. An illuminating device as defined in claim 8, wherein said reflector is contained within said enclosure.

10. An illuminating device as defined in claim 9, wherein said reflector is a prismatically shaped, substantially non light absorbing, dielectric.

11. An illuminating device, comprising:
    (a) a light source having a longitudinally specular light reflector; and,
    (b) a light escapement port having a substantially non light absorptive cover separate from said reflector, the transmissivity of said cover at any point on said cover varying as a function of the position of said point, whereby light escaping through said cover at said point has a selected luminous exitance as a function of said position;
    wherein said reflector comprises a partially transmissive light reflector, and wherein said reflector is shaped to direct a substantial portion of the light emitted by said light source in a direction which is:
    (c) substantially parallel to the surface of said cover closest to said light source; and,
    (d) away from said light source.

12. An illuminating device, comprising:
    (a) a light source having a longitudinally specular light reflector; and,
    (b) a light escapement port having a substantially non light absorptive cover separate from said reflector, the transmissivity of said cover at any point on said cover varying as a function of the position of said point, whereby light escaping through said cover at said point has a selected luminous exitance as a function of said position;
    wherein said reflector comprises a partially transmissive light reflector, and wherein said reflector is oriented relative to said light source to direct a substantial portion of the light emitted by said light source in a direction which is:
    (c) substantially parallel to the surface of said cover closest to said light source; and,
    (d) away from said light source.

13. An illuminating device, comprising:
    (a) a light source having a longitudinally specular light reflector;
    (b) a light escapement port having a substantially non light absorptive cover separate from said reflector, the transmissivity of said cover at any point on said cover varying as a function of the position of said point, whereby light escaping through said cover at said point has a selected luminous exitance as a function of said position;
    wherein said reflector comprises a partially transmissive light reflector, and wherein said device further comprises a hollow enclosure.

14. An illuminating device as defined in claim 13, wherein said light source is contained within said enclosure.

15. An illuminating device as defined in claim 14, wherein said reflector is contained within said enclosure.

16. An illuminating device as defined in claim 15, wherein said reflector is a prismatically shaped, substantially non light absorbing, dielectric.

17. An illuminating device, comprising:
    (a) a light source having a longitudinally specular light reflector; and,
    (b) a light escapement port having a substantially non light absorptive cover separate from said reflector, the transmissivity of said cover at any point on said cover varying as a function of the position of said point, whereby light escaping through said cover at said point has a selected luminous exitance as a function of said position;
    wherein said reflector is a prismaticly shaped dielectric having at least some reflectivity due to total internal reflection within said reflector, and wherein said reflector is shaped to direct a substantial portion of the light emitted by said light source in a direction which is:
    (c) substantially parallel to the surface of said cover closest to said light source; and,
    (d) away from said light source.

18. An illuminating device, comprising:
(a) a light source having a longitudinally specular light reflector; and,
(b) a light escapement port having a substantially non light absorptive cover separate from said reflector, the transmissivity of said cover at any point on said cover varying as a function of the position of said point, whereby light escaping through said cover at said point has a selected luminous exitance as a function of said position;
wherein said reflector is a prismaticly shaped dielectric having at least some reflectivity due to total internal reflection within said reflector, and wherein said reflector is oriented relative to said light source to direct a substantial portion of the light emitted by said light source in a direction which is:
(c) substantially parallel to the surface of said cover closest to said light source; and,
(d) away from said light source.

19. An illuminating device, comprising:
(a) a light source having a longitudinally specular light reflector;
(b) a light escapement port having a substantially non light absorptive cover separate from said reflector, the transmissivity of said cover at any point on said cover varying as a function of the position of said point, whereby light escaping through said cover at said point has a selected luminous exitance as a function of said position;
wherein said reflector is a prismaticly shaped dielectric having at least some reflectivity due to total internal reflection within said reflector, and wherein said device further comprises a hollow enclosure.

20. An illuminating device as defined in claim 19, wherein said light source is contained within said enclosure.

21. An illuminating device as defined in claim 20, wherein said reflector is contained within said enclosure.

22. An illuminating device as defined in claim 21, wherein said reflector is a prismatically shaped, substantially non light absorbing, dielectric.

23. An illuminating device, comprising:
(a) a light source having a longitudinally specular light reflector; and,
(b) a light escapement port having a substantially non light absorptive cover separate from said reflector, the transmissivity of said cover at any point on said cover varying as a function of the position of said point, whereby light escaping through said cover at said point has a selected luminous exitance as a function of said position;
wherein said reflector is:
(c) a prismaticly shaped dielectric having at least some reflectivity due to total internal reflection within said reflector; and,
(d) substantially coextensive with said cover;
and wherein said reflector is shaped to direct a substantial portion of the light emitted by said light source in a direction which is:
(e) substantially parallel to the surface of said cover closest to said light source; and,
(f) away from said light source.

24. An illuminating device, comprising:
(a) a light source having a longitudinally specular light reflector; and,
(b) a light escapement port having a substantially non light absorptive cover separate from said reflector, the transmissivity of said cover at any point on said cover varying as a function of the position of said point, whereby light escaping through said cover at said point has a selected luminous exitance as a function of said position;
wherein said reflector is:
(c) a prismaticly shaped dielectric having at least some reflectivity due to total internal reflection within said reflector; and,
(e) substantially coextensive with said cover;
and wherein said reflector is oriented relative to said light source to direct a substantial portion of the light emitted by said light source in a direction which is:
(e) substantially parallel to the surface of said cover closest to said light source; and,
(f) away from said light source.

25. An illuminating device, comprising:
(a) a light source having a longitudinally specular light reflector;
(b) a light escapement port having a substantially non light absorptive cover separate from said reflector, the transmissivity of said cover at any point on said cover varying as a function of the position of said point, whereby light escaping through said cover at said point has a selected luminous exitance as a function of said position;
wherein said reflector is:
(c) a prismaticly shaped dielectric having at least some reflectivity due to total internal reflection within said reflector; and,
(d) substantially coextensive with said cover,
and wherein said device further comprises a hollow enclosure.

26. An illuminating device as defined in claim 25, wherein said light source is contained within said enclosure.

27. An illuminating device as defined in claim 26, wherein said reflector is contained within said enclosure.

28. An illuminating device as defined in claim 27, wherein said reflector is a prismatically shaped, substantially non light absorbing, dielectric.

* * * * *

UNITED STATES PATENT AND TRADEMARK OFFICE
CERTIFICATE OF CORRECTION

PATENT NO. : 4,937,716

DATED : June 26, 1990

INVENTOR(S) : WHITEHEAD

It is certified that error appears in the above-identified patent and that said Letters Patent is hereby corrected as shown below:

On the title page, in the abstract, fourth line, delete "an" and insert therefor --at--.

Column 2, lines 23-50, delete the entire paragraph.

Column 2, line 55, after the word "cover" insert therefor --separate from the reflector--.

Column 2, lines 56-57, delete "separate from the reflector".

Signed and Sealed this

Thirty-first Day of March, 1992

Attest:

HARRY F. MANBECK, JR.

*Attesting Officer*   *Commissioner of Patents and Trademarks*